April 28, 1959   W. E. SWIFT, JR   2,884,537
RADIO-ACTIVE MEASURING SYSTEM COMPENSATION
Filed Jan. 26, 1956
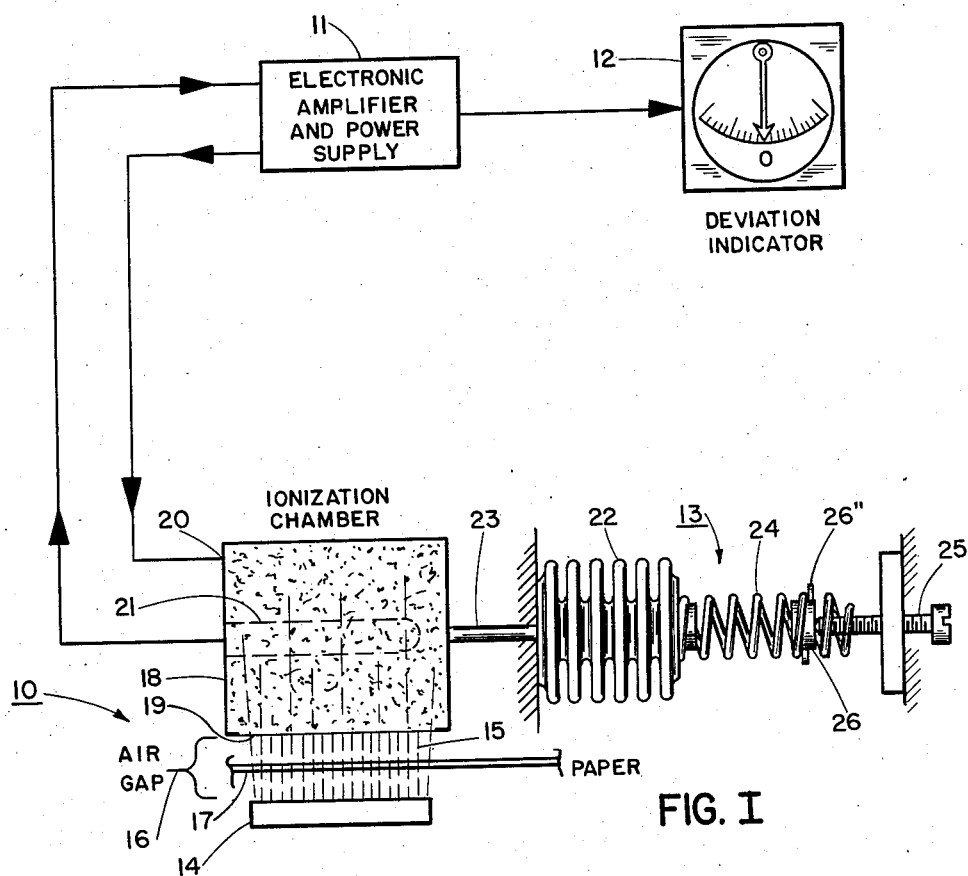
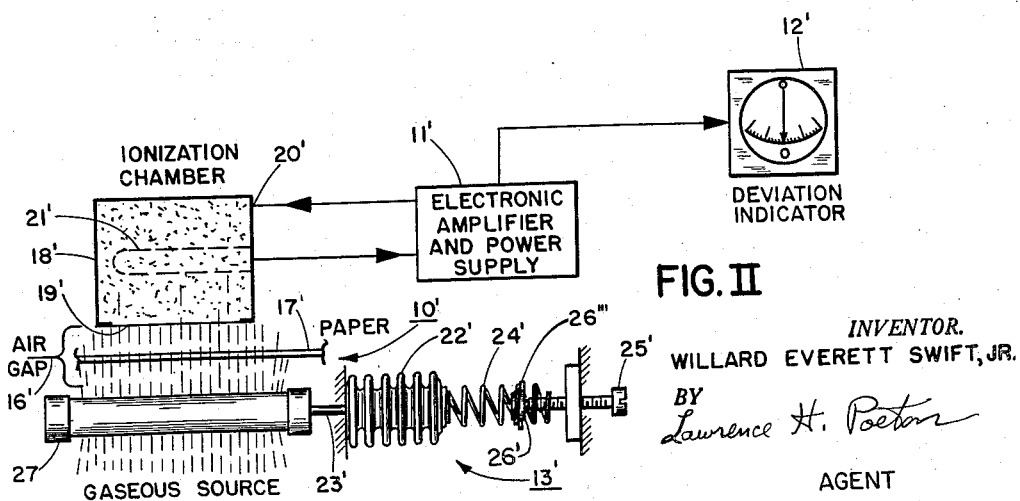
INVENTOR.
WILLARD EVERETT SWIFT, JR.
BY
Lawrence H. Poeton
AGENT

United States Patent Office 2,884,537
Patented Apr. 28, 1959

2,884,537

RADIO-ACTIVE MEASURING SYSTEM COMPENSATION

Willard Everett Swift, Jr., Sharon, Mass., assignor to The Foxboro Company, Foxboro, Mass., a corporation of Massachusetts Application January 26, 1956, Serial No. 561,512

1 Claim. (Cl. 250—83.6)

This invention relates to radiation absorption gauging and to the measurement of ionizing radiation generally. It is directed to compensation of such errors as normally affect the accuracy of such measurement and gauging, due to changes of barometric pressure and temperature as such changes affect the density of air in the air between the source of radiation and the ionization chamber in systems provided for such gauging and measurement.

This invention involves a gauging system wherein radiation as from a radio-active source is directed through a suitable gap, such as an air gap, into an ionization chamber. As one example, the system may be one for measuring radiation and as another example, the system may be one with a material under test being placed in the air gap. This material may be paper, and the variable condition thereof which is being measured may be the basis weight of the paper. The ionization chamber in any case is polarized and contains air or other suitable gas, for example, argon or a mixture of argon and nitrogen. The gas in the ionization chamber is ionized by the radiations which enter the ionization chamber. Thus the ionization in the ionization chamber, and consequently the electrical current through the ionization chamber polarization arrangement, are functions of the radiation diminishing factor of the air gap or of the air gap plus the material under test.

Gauging sources for use in such systems have in the past been in the form of solid bodies charged with radioactive isotopes such as thallium 204 (beta rays), strontium 90 (beta rays), or cobalt 60 (gamma rays). It is here submitted that a source for this purpose may also comprise a container or chamber having a radio-active isotope gas therein such as krypton 85, with a container or chamber having at least a portion of its wall area comprising a beta ray permeable window. Thus the phrase "gas chamber" as used herein is intended to encompass both ionization chambers and gaseous source chambers.

In the operation of a gauging system of the type with which this invention is concerned, the density of the air or gas in the gap between the radio-active source and the ionization chamber is subject to ambient conditions of temperature and barometric pressure. Further, such air or gas has substantial absorption effect on the radiations passing therethrough. Changes in ambient temperature or barometric pressure cause the density of this "gap" air or gas to vary and consequently the ionization radiation absorption effect of the gas is varied. This action, in turn means that the quantity of radiation entering the ionization chamber is varied with ambient temperature and barometric changes, without any change occurring in the measured variable, and errors accordingly occur in the system.

The device provided by this invention obviates this difficulty and essentially eliminates such errors by automatically varying the density of a chambered gas in such systems in accordance with the "gap" density variation as occasioned by such ambient temperature or barometric pressure changes.

In an ionization chamber or in a gaseous source as described herein, the sensitivity varies with the amount and weight of gas in the chamber, among other things. As a matter of illustration, if the device had a leaky chamber, rising temperature would drive gas out through the leak and thus reduce the sensitivity of the chamber unit. In the air gap between the source and the ionization chamber, rising temperature decreases the air density in the gap and thus increases the ionization radiation to the ionization chamber. A chamber leak in this instance would act in the proper direction to compensate for such changes in the air gap. However, even a small leak in the chamber could readily over-compensate. In the present invention the "leak" is a permanent bellows arrangement which provides a controlled, reversible "leak." Similarly, in this illustrative example, a drop in barometric pressure would reduce the amount of gas in a leaky chamber, with a consequent reduction in sensitivity thereof, in the direction of compensation for increased radiation to the chamber due to the density decrease in the air in the air gap as caused by the barometric pressure drop. However, the controlled, reversible leak of this invention compensates for both or either temperature changes and barometric pressure changes and may be applied to either the ionization chamber or a gaseous source, or both, as desired.

Thus in this invention, with a solid material source, when the "gap" density changes and more ionizing radiations enters the ionization chamber so that ordinarily the ionization and consequently the ionization current would change as an error; the gas in the ionization chamber is also changed in density in the same direction as the "gap" gas density change, and the potential error in ionization is compensated for and the error avoided. Similarly, in this invention, when a gaseous radio-active source is used, this source may be similarly compensated as to density so that when the "gap" gas density varies the gas source density also varies in the same direction to vary the amount of radiation from the source in compensation for the potential error in the ionization in the ionization chamber.

The extra degree of accuracy of gauging provided by this invention is of particular value when a material is under test which is quite thin, for example, cigarette paper.

It is, accordingly, an object of this invention to provide an improved radiation measurement system.

It is a further object of this invention to provide automatic compensation in such a system for "gap" density variation due to ambient temperature on barometric pressure variation.

Other objects and advantages of this invention will be in part apparent and in part pointed out hereinafter.

In the drawings:

Figure I is a schematic illustration of a radio-active gauging system embodying this invention with particular reference to compensation as applied to the ionization chamber; and Figure II is a schematic illustration of a radio-active gauging system embodying this invention with particular reference to compensation as applied to a gaseous radio-active beta ray source.

As an illustrative embodiment of this invention a measuring system is shown in Figure I. It comprises generally, a measuring arrangement 10, an electronic amplifier and power supply 11, a deviation indicator 12, and a compensating bellows assembly 13.

The measuring arrangement 10 is provided with a radioactive beta ray gauging source 14, which is a solid body, charged with material such as thallium 204 or strontium 90. The source 14 emits beta rays 15, which pass through an air gap 16, and through a body of material 17 under test, to and into an ionization chamber 18 by way of a thin stainless steel beta ray permeable window 19 in the ionization chamber 18. The material 17 may be paper, and the measured variable may be the basis weight of the paper. The ionization chamber 18 contains a gas such as argon or a mixture of nitrogen and argon and the beta rays entering the ionization chamber ionize this gas to a degree which is a factor of the basis weight of the paper. Thus as the paper absorbs varying amounts of the beta radiation due to basis weight variation in the paper, the degree of ionization in the chamber 18 is also varied. The ionization chamber 18 is electrically polarized through a supply electrode 20 and a collector electrode 21. Accordingly, varying electrical current may flow in the ionization chamber 18 in representation of the basis weight variation in the paper 17. For this purpose electrical connections are provided between the amplifier and power supply 11 and the ionization chamber electrodes 20 and 21. The ionization chamber output is thus amplified and then applied to the deviation indicator 12. As a zero setting, the deviation indicator 12 is set to mid-scale in representation of a predetermined basis weight value of the paper 17 and increase or decrease of the basis weight results in deviation from this zero in the indicator 12 to the left or right as the case may be.

The air in the air gap 16 has an absorption effect on the beta rays passing therethrough and the zero setting of the indicator 12 is established for a particular density of air in the air gap. However, this body of air in the air gap 16 is subject to density variation due to ambient atmospheric condition changes such as temperature variation, barometric pressure variation, or combinations of these. As the air gap air density changes, the amount of the beta rays to reach the ionization chamber is accordingly varied, with consequent error in the deviation indication since this indication change is not due to basis weight change. However, the same ambient atmospheric conditions are applied to the ionization chamber 18, and this invention provides an automatic compensation in the ionization chamber for such error variations in the arriving amounts of beta rays. This compensation is in the form of density variation of the gas in the ionization chamber, and is accomplished through the use of a bellows 22, pneumatically connected to the ionization chamber 18 through a pipe 23. The bellows 22 is spring loaded as at 24, and this loading is adjustable as a zero set by means of an adjustment screw 25 which bears on the spring terminal member 26 and may be turned to apply more or less force to the bellows 22 through the spring 24 as desired. This arrangement is thus a density adjustment for the gas in the ionization chamber 18. A spring rate adjustment is also provided in that the terminal member 26 may be rotated by its ears 26″ as a means of moving the terminal member 26 along the spring 24 to vary the effective length thereof.

With the compensating bellows arrangement described above, when an ambient temperature increase thins out the air in the gap 16 the increase of beta rays to the chamber 18 does not have an increased ionization effect because the same temperature increase drives some of the gas in the ionization chamber into the bellows 22, thus thinning the body of gas which is subject to ionization. Similarly, a barometric pressure drop would thin the air in the gap 16 and at the same time allow the bellows 22 to expand so as to draw some of the gas from the ionization chamber 18 and produce a compensating thinning of the body of gas in the chamber 18. Ambient temperature decrease would produce opposite effects and compensation in either direction may result from the combined effects of temperature and barometric pressure changes. It is possible that a temperature increase and a barometric pressure increase together would leave the densities of the air in the air gap 16 and the gas in the ionization chamber 18 unchanged.

The various volumes, dimensions, and pressure arrangements are predetermined to provide the most desirable action through the most useful span of operation, according to the expected ambient atmospheric conditions.

Figure II illustrates a system according to this invention, wherein a gaseous, krypton 85, radio-active source unit 27 is used instead of the solid source 14 of the Figure I structure. Thus in the Figure II system, the compensated chamber is in the source unit 27 instead of the ionization chamber 18 as in Figure I. Consequently a compensating bellows unit 13′ is connected to the Figure II source unit 27 instead of the Figure I arrangement wherein the like bellows unit 13 is connected to the ionization chamber 18. Thus in the Figure II system, when the density of the air gap 16′ is varied by ambient atmospheric conditions which also are applied to the source unit 27, the density of the gas in the source unit 27 is varied in compensation therefor. The various comparable parts of Figure II are identified with respect to Figure I by the primes of the reference numbers used in Figure I.

This invention, therefore, provides a new and improved radio-active gauging device wherein compensation for atmospheric condition changes is automatically provided.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

I claim:

A system for measuring the basis weight of paper wherein radiation from a radio-active source is passed through the paper and into an ionization chamber, said system comprising a fixedly mounted radioactive source and a fixedly mounted fixed volume ionization chamber with an air gap between said source and said chamber for receiving paper to be measured, a body of gas in said chamber and ionizable on an operating basis by radiations from said fixed source, a rigid, closed pipe having one end opening into said chamber with said chamber otherwise fully closed, and a bellows having one end fixedly mounted on the other end of said pipe with said bellows open to said pipe and otherwise fully closed and changeable in inner volume in accordance with pressure changes applied thereto, said bellows being subject to the same atmospheric ambiency as is said air gap, whereby when changes in air density occur in said air gap compensating changes occur in the density of said body of gas in said ionization chamber, as occasioned by changes in the inner volume of said bellows due to the same condition changes which occasioned said changes in said air gap density.

References Cited in the file of this patent

UNITED STATES PATENTS

| | | |
|---|---|---|
| 2,523,287 | Friedman | Sept. 26, 1950 |
| 2,576,100 | Brown | Nov. 27, 1951 |
| 2,643,343 | Rainwater | June 23, 1953 |
| 2,730,626 | Varney | Jan. 10, 1956 |
| 2,761,976 | Obermaier et al. | Sept. 4, 1956 |
| 2,800,591 | Gilman | July 23, 1957 |